D. H. Paul,
Cultivator,
Nº 92,350. Patented Jul. 6. 1869.
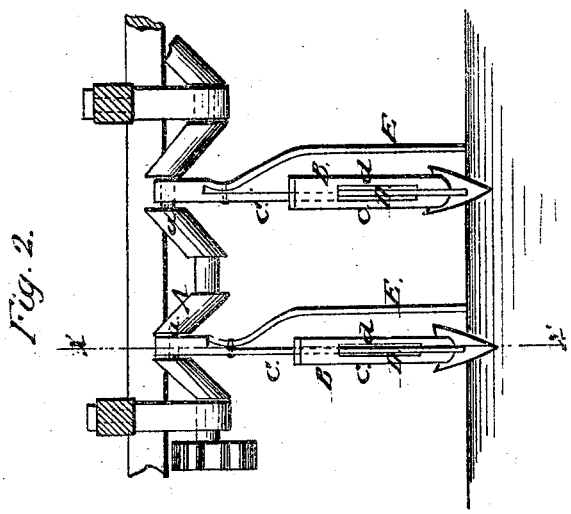
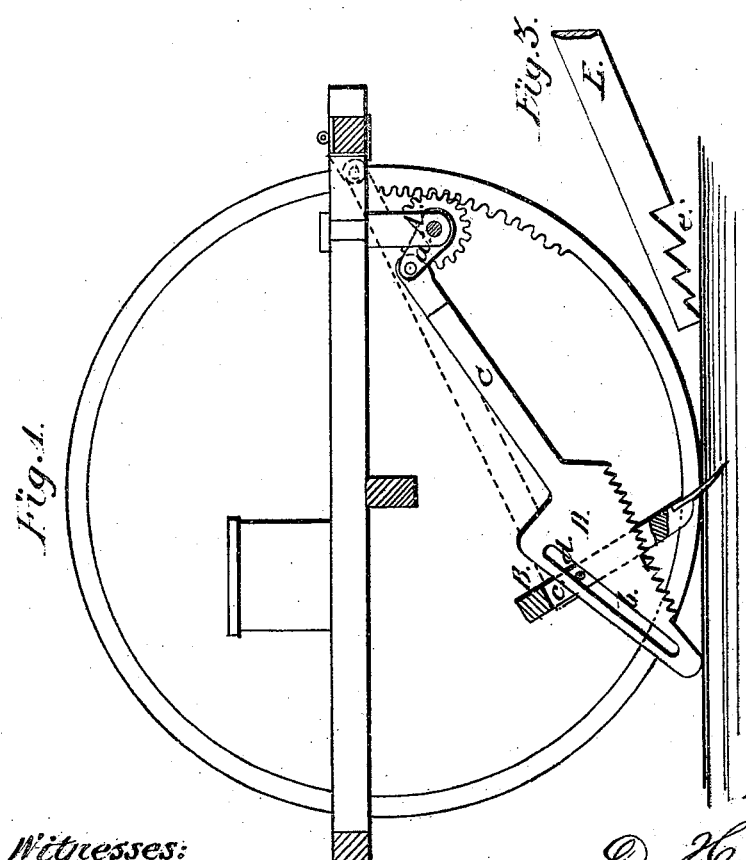
Witnesses:
Wm. A. Morgan
G. C. Cotton
Inventor:
D. H. Paul
per Murray & ?
Attorneys

United States Patent Office.

D. H. PAUL, OF DE WITT, IOWA.

Letters Patent No. 92,350, dated July 6, 1869.

---

IMPROVEMENT IN CULTIVATORS.

---

The Schedule referred to in these Letters Patent and making part of the same.

---

*To all whom it may concern:*

Be it known that I, D. H. PAUL, of De Witt, in the county of Clinton, and State of Iowa, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a side sectional view of a portion of a cultivator, having my improvement attached, x x, fig. 2, showing the line of section.

Figure 2 is a front view of the same.

Figure 3 is a detached view of a toothed bar, pertaining to the same.

Similar letters of reference indicate like parts.

This invention relates to a new and useful improvement in cultivators, and has for its object the prevention of the choking or clogging of the implement by weeds, stalks, and similar trash.

The invention consists in the application of saws to the plow or share-standards, in such a manner that the shares or plows are kept free from all weeds or trash, the latter being either cut by the action of the saws, or forced off from the shares or plows.

The frame of the cultivator may be constructed in any proper manner, and mounted on wheels, in the usual way. These parts are shown in red.

On the front part of this frame there is secured, transversely, a crank-shaft, A, which is operated from the wheels on which the frame of the machine is mounted, by means of gearing, as shown clearly in fig. 1.

B represents plow or share-standards, which are attached to the rear end of beams, the front ends of the latter being secured by joints to the front cross-bar of the frame of the machine, as shown in red in fig. 1.

C represents bars, which are attached to the cranks *a* of the shaft A.

These bars extend backward a suitable distance, and have saw-blades, D, at their rear ends, through which slots, *b*, are made.

These saw-blades work through slits, *c*, in the plow or share-standards B, and pins, *d*, pass transversely through the standards and the slots *b*, as shown in fig. 1, said pins serving as guides for the saws.

The lower toothed edges of the saws work directly over the tops of the plows or shares, and hence, it will be seen that the saws, under the reciprocating motion given them by the crank-shaft, will cut or sever stalks, weeds, or any trash which may catch on the plow or share-standards; or, if the saws do not cut or sever such trash, they will cast it off from the plows or shares.

I design, in practice, to have supplemental bars, E, attached to one side of the bars C, the former extending back as far as a little behind the standards B, and having coarse teeth, *e*, at their lower edges, as shown in fig. 3. This arrangement insures the stripping of the weeds and trash from the plow or share-standards.

Having thus described my invention,

I claim as new, and desire to secure by Letters Patent—

The application of reciprocating saws to a cultivator, in the manner substantially as shown and described, for the purpose of cutting or severing weeds or trash, which may adhere to the plow or share-standards, and stripping it from the latter, as set forth.

D. H. PAUL.

Witnesses:
C. J. HADLEY,
JAMES E. EGGLESTON.